US011976634B2

(12) United States Patent
Rust et al.

(10) Patent No.: US 11,976,634 B2
(45) Date of Patent: May 7, 2024

(54) METHOD AND ASSEMBLY FOR ACCESSING SCADA DATA OF WIND TURBINES

(71) Applicant: Siemens Gamesa Renewable Energy Service GmbH, Hamburg (DE)

(72) Inventors: Leander Rust, Hamburg (DE); Hennig Harden, Hamburg (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 471 days.

(21) Appl. No.: 17/283,832

(22) PCT Filed: Oct. 8, 2019

(86) PCT No.: PCT/EP2019/077175
§ 371 (c)(1),
(2) Date: Apr. 8, 2021

(87) PCT Pub. No.: WO2020/074485
PCT Pub. Date: Apr. 16, 2020

(65) Prior Publication Data
US 2021/0388816 A1 Dec. 16, 2021

(30) Foreign Application Priority Data
Oct. 10, 2018 (DE) .......................... 102018007996.2

(51) Int. Cl.
*F03D 7/04* (2006.01)
*F03D 17/00* (2016.01)
(Continued)

(52) U.S. Cl.
CPC ............. *F03D 7/047* (2013.01); *F03D 17/00* (2016.05); *H04L 9/3247* (2013.01);
(Continued)

(58) Field of Classification Search
None
See application file for complete search history.

(56) References Cited

U.S. PATENT DOCUMENTS 7,023,105 B2 * 4/2006 Wobben .................... F03D 7/02
290/43
7,420,289 B2 * 9/2008 Wang ...................... F03D 7/042
290/55
(Continued)

FOREIGN PATENT DOCUMENTS

DE 102012204446 A1 9/2013
DE 102015007649 A1 12/2016

OTHER PUBLICATIONS

PCT International Research Report and Written Decision for International Application No. PCT/EP2019/077175 filed Oct. 8, 2019; dated Jan. 31, 2020; 6 pgs.
(Continued)

*Primary Examiner* — Jason Lin
(74) *Attorney, Agent, or Firm* — Alix, Yale & Ristas, LLP

(57) ABSTRACT

The invention relates to a method for accessing SCADA data of a wind turbine in a protected manner and to an assembly designed to carry out said method. The SCADA data together with master data of the wind turbine is transmitted to a broker server in a digitally signed form, said broker server generating a metadata set on the basis of said data and transmitting the metadata set to user clients. If the user client is interested in the SCADA data, the user client transmits the metadata set back to the broker server in a digitally signed form. The broker server responds with a likewise digitally signed delivery data set comprising the metadata set signed by the user client and the SCADA and master data belonging to the metadata set.

9 Claims, 1 Drawing Sheet

(51) Int. Cl.
  *H04L 9/32* (2006.01)
  *H04L 67/562* (2022.01)
  *G06Q 50/06* (2012.01)
  *H04L 9/00* (2022.01)

(52) U.S. Cl.
  CPC ........... *H04L 67/562* (2022.05); *G06Q 50/06* (2013.01); *H04L 9/50* (2022.05)

(56) References Cited

U.S. PATENT DOCUMENTS

| | | | | |
|---|---|---|---|---|
| 7,902,686 B2* | 3/2011 | Andersen | ................ | F03D 7/044 290/55 |
| 8,022,565 B2* | 9/2011 | Scholte-Wassink | ......................... | F03D 7/0292 290/55 |
| 8,115,333 B2* | 2/2012 | Parsche | .................. | F03D 13/20 290/55 |
| 8,120,194 B2* | 2/2012 | Hoffmann | ................ | F03D 7/00 290/44 |
| 8,328,514 B2* | 12/2012 | Viripullan | ............. | F03D 7/0268 416/61 |
| 8,738,192 B2* | 5/2014 | Uphues | ................ | F03D 7/0292 290/55 |
| 8,779,611 B2* | 7/2014 | Kabatzke | .............. | F03D 7/0224 290/44 |
| 8,878,378 B2* | 11/2014 | Kabatzke | .............. | F03D 7/0224 290/44 |
| 9,018,787 B2* | 4/2015 | Dange | .................... | F03D 7/026 290/55 |
| 9,404,478 B2* | 8/2016 | Scholte-Wassink | ........................ F03D 7/0244 |
| 11,193,470 B2* | 12/2021 | Messing | ............... | F03D 7/0224 |
| 2004/0064707 A1 | 4/2004 | McCann et al. | | |
| 2011/0054825 A1* | 3/2011 | Perla | .................. | G05B 23/0286 290/44 |
| 2012/0166000 A1* | 6/2012 | Ellena | .................. | G05B 19/042 700/287 |
| 2012/0271593 A1* | 10/2012 | Uluyol | ................... | F03D 7/048 702/182 |
| 2013/0290705 A1 | 10/2013 | Lovmand | | |
| 2016/0327025 A1 | 11/2016 | Noto | | |
| 2017/0220815 A1 | 8/2017 | Ansari et al. | | |
| 2017/0310483 A1 | 10/2017 | Nagao et al. | | |

OTHER PUBLICATIONS

German Search Report for German Application No. 10 2018 007 996.2 filed Oct. 10, 2018; dated Jul. 16, 2019; 8 pgs.

* cited by examiner

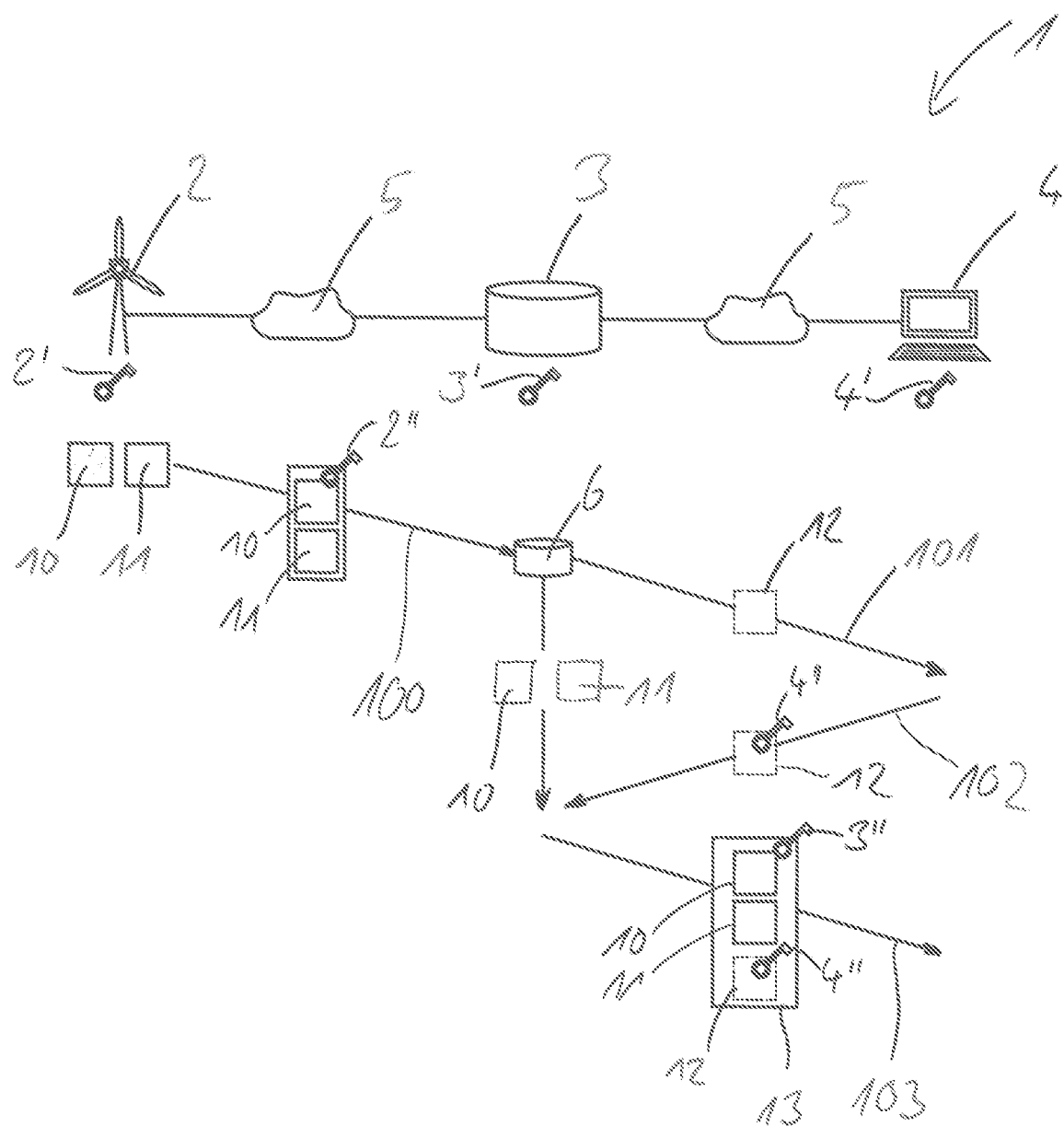

METHOD AND ASSEMBLY FOR ACCESSING SCADA DATA OF WIND TURBINES

BACKGROUND

The invention relates to a method for accessing SCADA data of a wind turbine in a protected manner and to an assembly designed to carry out this method.

Wind turbines are known from the prior art. They generally comprise a rotor which is rotatably arranged on a nacelle, wherein the nacelle in turn is rotatably arranged on a tower. The rotor drives a generator, possibly via a rotor shaft and a transmission. A rotational movement of the rotor that is induced by wind can therefore be converted into electrical energy which can then be fed into an electrical grid via converters and/or transformers—and at least partially directly depending on the design of the generator. The rotor comprises a plurality of (generally three) rotor blades which extend radially from the rotor axis and are rotatably fastened with respect to a rotor hub in order to set the angle of attack of the rotor blades. Wind turbines have a multiplicity of sensors which are taken into account by a turbine controller when controlling the wind turbine.

It is known practice to incorporate wind turbines and their turbine controllers in a SCADA system, in which the various operating parameters of the wind turbine are transmitted to a superordinate control unit and control commands and setpoint values which possibly need to be taken into account are received therefrom.

The data made available to a superordinate control unit by the turbine controller may comprise the measured values captured by the sensors, control commands and/or setpoint values transmitted from the turbine controller to individual components of the wind turbine as well as other information describing the actual state of the wind turbine.

These data—possibly together with the control commands or setpoint values from the subordinate control unit—are regularly needed to create assessments. For this purpose, the data must verifiably come from the wind turbine to be assessed and must not have been manipulated. At the same time, the data are intended to be available only to authorized users, for example appointed assessors. The authorized users can then process the data further in order to thus detect possible malfunctions of the wind turbine, for example, or to develop optimizations for operation of the wind turbine.

SUMMARY OF THE INVENTION

The object of the present invention is to provide a method and an assembly which easily allow protected access to SCADA data of a wind turbine.

This object is achieved by means of a method according to the main claim and an assembly according to claim 10. The dependent claims relate to advantageous developments.

Accordingly, the invention relates to a method for accessing SCADA data of a wind turbine in a protected manner, wherein the wind turbine is designed to capture SCADA data, characterized by the steps of:

a) the wind turbine capturing SCADA data and the wind turbine supplementing the captured SCADA data with master data of the wind turbine;

b) the wind turbine digitally signing and transmitting the SCADA and master data to a broker server for further processing and storage;

c) the broker server creating a metadata record from the received SCADA and master data with information relating to the scope and properties of the SCADA and master data;

d) transmitting the metadata record to at least one user client;

in the event of interest in the SCADA and master data identified by the metadata record:

e) the user client digitally signing and transmitting the metadata record to the broker server;

f) the broker server creating and digitally signing a delivery data record comprising the metadata record signed by the user client and the SCADA and master data belonging to the metadata record; and g) transmitting the signed delivery data record to the user client.

The invention also relates to an assembly comprising a wind turbine, a broker server and a user client, which are suitably designed to carry out the method according to the invention and have a data connection to one another.

Some terms used in connection with the invention are first of all explained.

"SCADA data" are data captured by the turbine controller of the wind turbine during operation, for example measurement data from sensors, actual and setpoint values of controllable components and possibly external control commands, as conventional for other SCADA applications.

"Master data" of a wind turbine are used to denote data which basically characterize the wind turbine and are regularly stored in the turbine controller of a wind turbine. In addition to a unique identification of the wind turbine, for example in the form of a unique serial number, these master data can also fundamentally include information relating to the turbine type, the turbine configuration, for example the tower height, blade length and nominal power, and/or the turbine location, for example in the form of geographical coordinates.

A "digital signature" is an item of checking information which is generated on the basis of any desired data and a secret key and can be checked by a receiver on the basis of a public key belonging to the secret key. Not only the origin of the data but also their integrity can be determined by checking the digital signature by means of a public key.

A "distributed ledger database" involves databases which are managed in a decentralized manner on distributed computers and result in a consensus as regards the sequence of database entries and changes. One example of such a distributed ledger database is a blockchain. A "blockchain" is a continuously expandable list of data records which are chained to one another in a tamperproof manner by means of cryptographic methods. In this case, each data record typically comprises a cryptographically secure variation value of one or more preceding data records, a time stamp and the actual useful data, in this case a hash value and assessment variables. The blockchain can also be managed and stored in a decentralized manner, as a result of which its security can be increased again.

The method according to the invention enables simple protected access to SCADA data of a wind turbine.

As is fundamentally known from the prior art, the SCADA data are captured by the wind turbine or its turbine controller. In order to make it possible to subsequently assign the SCADA data to the wind turbine or at least to the type of wind turbine, the captured SCADA data are also supplemented with master data of the wind turbine.

The data packet comprising SCADA and master data is then digitally signed, for which purpose it is possible to resort to a secret key stored in the turbine controller. The accordingly signed SCADA and master data are then transmitted to a broker server for further processing and storage. In this case, the broker server can check the signature of the SCADA and master data in order to thus ensure the origin and integrity of the received data.

It is possible for the received master data to be supplemented with further information which is stored in the broker server and can be uniquely assigned to the turbine, from which the data come, on the basis of the transmitted master data. This makes it possible to reduce bandwidth when transmitting data between the turbine controller and the broker server.

Part of the further processing by the broker server involves creating a metadata record from the received SCADA and master data. The metadata contained in the data record comprise information relating to the scope and properties of the SCADA and master data, that is to say, in particular, information relating to which data from which wind turbine are available over which period. A metadata record can be interpreted as a directory of the SCADA and master data.

The metadata record created in this manner is then transmitted to at least one user client. In this case, it is insignificant whether the metadata record is transmitted to the at least one user client in an unsolicited manner (push method) or whether the user client must actively retrieve the metadata record (pull method), for example by actively downloading the metadata record via a website. It goes without saying that a multiplicity of user clients may also be provided.

Information relating to which SCADA and master data are available in the broker server is now present at the user client. The method is continued only if there is interest in the SCADA and master data associated with a metadata record. Interest can be manually indicated by a user in this case with a suitable input on the user client or it is automatically determined by the user client that the received metadata record satisfies particular criteria, for example can be assigned to a particular predefined wind turbine.

If there is interest in the SCADA and master data associated with a metadata record, the metadata record is digitally signed by the user client. For this purpose, the user client may have a suitable private key. The signed metadata record is then transmitted to the broker server.

After receiving a signed metadata record, the broker server creates a delivery data record which, in addition to SCADA and master data belonging to the metadata record, also comprises the metadata record signed by the user client. The delivery data record is then digitally signed by the broker server and is then transmitted to the user client.

The method according to the invention provides the advantage that the transmission path between the wind turbine and the user client via the broker server is protected from tampering by means of digital signatures. In addition, it is possible to track the delivery data records since the digital signature of the user client is concomitantly captured from the digital signature by the broker server and therefore cannot be changed or removed without invalidating the broker signature. If the delivery data records are forwarded to unauthorized third parties, it is possible to deduce, from the forwarded data record, the user client and therefore the channels via which the data records have reached possibly unauthorized third parties.

Even though it may be fundamentally possible to forward data from the delivery data record without the two signatures, the integrity of the delivery data record and of the SCADA and master data contained therein is no longer guaranteed in this case. The data from the delivery data record are virtually worthless without the two signatures since an advisory or other content-related use of the data, for example for optimization purposes, is no longer permissible or actually usable on account of a lack of guaranteed data integrity.

The method according to the invention therefore indirectly ensures that the SCADA and master data are ultimately used only by the actually authorized users since forwarding of the data without the signatures provided according to the invention makes the data virtually worthless and, if a delivery data record including the signatures is forwarded, the user client who requested the data can be uniquely identified. The latter can be used for contractual sanctions, for example.

It is preferred if, when creating the delivery data record, the signature of the SCADA and master data is removed by the wind turbine. This ensures that the SCADA and master data cannot be separated in a digitally signed form from a delivery data record, from whose signature the integrity of the data can be deduced. Even though a user must trust in the broker server not tampering with the data in this case, it is advantageous to guarantee the integrity of the SCADA and master data in the delivery data record solely in combination with the metadata record digitally signed by the user client.

Unsigned and signed metadata records are preferably transmitted between the broker server and user clients in the form of data records of a distributed ledger database, preferably a blockchain, to which both the broker server and the user clients have access. Data transmission security, in particular protection from tampering, can be increased further by using a distributed ledger database.

It is preferred if, before creating and fixing the delivery data record, a transaction stored in the distributed ledger database as a smart contract is performed and the delivery data record is created and signed only in the event of a positive conclusion of the transaction. Possible transactions may be financial transactions and the checking of the authorization of a user client to retrieve the requested SCADA and master data. Performing corresponding transactions before a delivery data record is created and signed makes it possible to ensure that delivery data records are delivered to a user client only when the latter meets requirements necessary for this purpose.

This is because, irrespective of the form of the transaction, in particular which checks the transaction includes, it is preferred if the transaction is initiated by transmitting a version of the metadata record electronically signed by the user client, which version is electronically (counter)signed by the broker server. This makes it possible to ensure that financial transactions, for example, between a user client and the broker server are performed only when a valid signature from both "parties" is available.

It is preferred if at least two metadata records are generated by the broker server from the received SCADA and master data with information relating to the respective scope and properties of the SCADA and master data, wherein the metadata records cover different sections of the SCADA and master data and only the SCADA and master data which are covered by the metadata record signed by the user client are taken into account when generating a delivery data record. Generating a plurality of metadata records which each cover different SCADA and master data makes it possible to provide the user clients with different delivery data records tailored to different user groups.

The metadata records may comprise information relating to the wind turbine, from which the SCADA and master data come, the scope of the data and/or the time interval of the available SCADA data. The master data preferably comprise a unique identifier, the geographical position, the turbine type and/or the basic configuration of the wind turbine. The SCADA data may comprise measured values captured by the wind turbine and/or external control commands or setpoint value presets received by the wind turbine.

For the explanation of the assembly according to the invention, reference is made to the above statements.

BRIEF DESCRIPTION OF THE DRAWINGS

The invention is now described on the basis of an advantageous embodiment with reference to the accompanying drawing, in which:

FIG. 1: shows a schematic illustration of an assembly designed to carry out the method according to the invention.

DETAILED DESCRIPTION

FIG. 1 shows an assembly 1 according to the invention. The assembly 1 comprises a wind turbine 2, a broker server 3 and a user client 4. The wind turbine 2 and the broker server 3, as well as the broker server 3 and the user client 4, each have a data connection to one another via the Internet 5. The wind turbine 2, the broker server 3 and the user client 4 each have a secret key 2', 3', 4' which is suitable for digitally signing data.

Master data 10 relating to the wind turbine 2 are stored in the wind turbine 2 or its turbine controller (not illustrated). The master data 10 comprise a unique identifier, the turbine type and the basic configuration (that is to say, in particular, information relating to the tower height, blade length and nominal power) of the wind turbine 2. In addition, SCADA data 11, which are composed of all measured values captured by the wind turbine and external setpoint value presets received by the wind turbine, are also captured in the wind turbine.

The SCADA and master data 10, 11 are transmitted to the broker server 3 at regular intervals via the Internet 5 (step 100). For this purpose, the SCADA and master data 10, 11 are together provided with a digital signature 2" on the basis of the secret key 2' of the wind turbine.

After being received, the digital signature 2" is checked by the broker server 3 and the correctly signed data are stored in the memory 6 of the broker server 3, in which case the signature 2" is discarded.

In addition, a metadata record 12, which, in addition to the unique identifier of the wind turbine 10, also comprises information relating to the period covered by the SCADA data and the content-related scope of the SCADA data, is generated from the received SCADA and master data 10, 11. This metadata record 12 is transmitted to the user client 4 (step 101).

If it is determined by the user client 4 in an automated manner or manually that there is interest in the SCADA and master data, the received metadata record 12 is provided with a digital signature 4" based on the secret key 4' of the user client 4 and is transmitted back to the broker server 3 (step 102).

After receiving the signed metadata record 12, the broker server 3 loads the SCADA and master data 10, 11 belonging to the metadata record 12 from the memory 6 and creates a delivery data record 13 therefrom.

In this case, the delivery data record 13 comprises the metadata record 12 signed by the user client 4, including the signature thereof, and the SCADA and master data 10, 11 belonging to this metadata record 12. The delivery data record 13 is supplemented with a signature 3" based on the secret key 3' of the broker server 3 before it is transmitted to the user client 4 (step 103).

The user client 4 therefore gains access to the SCADA and master data 10, 11 of the wind turbine 2, the integrity of which is guaranteed by the signature 3" of the broker server 3. The risk of unauthorized forwarding of the data is reduced in this case since the SCADA and master data 10, 11 can either only be forwarded without a signature, but their integrity is no longer guaranteed, or the origin of the data can be permanently traced back on account of the included signature 4" of the user client 4, which in turn can result in contractually agreed sanctions of the user.

In particular, the metadata record 12 is preferably transmitted in steps 101 and 102 via a blockchain, as a result of which the data transmission security can be increased further.

The invention claimed is:

1. A method for accessing supervisory control and data acquisition (SCADA) data of a wind turbine in a protected manner, wherein the wind turbine is designed to capture SCADA data, comprising the steps of:
   a) the wind turbine capturing SCADA data and the wind turbine supplementing the captured SCADA data with master data of the wind turbine, said master data of the wind turbine comprising unique identification data, turbine type data, turbine configuration data, and/or turbine location data;
   b) the wind turbine digitally signing and transmitting the signed SCADA and master data to a broker server for further processing and storage;
   c) the broker server creating a metadata record from the received SCADA and master data with information relating to the quantity and properties of the SCADA and master data;
   d) transmitting the metadata record to a user client;
   e) determining, by the user client, that the received metadata record satisfies a criteria, and in response to determining that the received metadata record satisfies the criteria, the user client digitally signing and transmitting the metadata record to the broker server;
   f) the broker server creating and digitally signing a delivery data record comprising the metadata record signed by the user client and the SCADA and master data belonging to the metadata record; and
   g) transmitting the signed delivery data record to the user client.

2. The method of claim 1, wherein when creating the delivery data record, the signature of the SCADA and master data generated by the wind turbine at step b) is removed by the broker server.

3. The method of claim 1, wherein unsigned and signed metadata records are transmitted in the form of data records of a distributed ledger database to which the broker server and the user client have access.

4. The method of claim 3, comprising determining a conclusion of the transaction, only in response to determining a conclusion of the transaction, creating and signing the delivery data record.

5. The method of claim 4, wherein the transaction is initiated by transmitting a version of the metadata record digitally signed by the user client, which version is digitally (counter) signed by the broker server.

6. The method of claim 1, wherein at least two metadata records are generated by the broker server from the received SCADA and master data with information relating to the respective scope and properties of the SCADA and master data, wherein each of the at least two metadata records cover different sections of the SCADA and master data and only the SCADA and master data which are covered by the metadata record signed by the user client are taken into account when generating a delivery data record.

7. The method of claim 1, wherein the metadata records comprise information relating to the wind turbine, from which the SCADA and master data come, the scope of the SCADA and master data or the time interval of the SCADA data.

8. The method of claim 1, wherein the SCADA data comprise measured values captured by the wind turbine or external control commands or setpoint value presets received by the wind turbine.

9. An assembly comprising a wind turbine, a broker server and a user client with a data connection to each other, configured to carry out a method comprising:
 a) the wind turbine capturing SCADA data and the wind turbine supplementing the captured SCADA data with master data of the wind turbine, said master data of the wind turbine including unique identification data, turbine type data, turbine configuration data, and/or turbine location data;
 b) the wind turbine digitally signing and transmitting the signed SCADA and master data to a broker server for further processing and storage;
 c) the broker server creating a metadata record from the received SCADA data and master data with information relating to the quantity and properties of the SCADA and master data;
 d) transmitting the metadata record to a user client;
 e) determining, by the user client, that the received metadata record satisfies a criteria, and in response to determining that the received metadata record satisfies the criteria, the user client digitally signing and transmitting the metadata record to the broker server;
 f) the broker server creating and digitally signing a delivery data record comprising the metadata record signed by the user client and the SCADA and master data belonging to the metadata record; and
 g) transmitting the signed delivery data record to the user client.

* * * * *